United States Patent [19]

Hayati et al.

[11] Patent Number: 5,306,478
[45] Date of Patent: Apr. 26, 1994

[54] PREPARATION OF GRANULAR COMPOSITIONS

[75] Inventors: Igan Hayati, Slough; Kenneth W. Taylor, Ewell; John M. Simon, Chessington, all of England

[73] Assignee: U.S. Borax Inc., Valencia, Calif.

[21] Appl. No.: 28,452

[22] Filed: Mar. 9, 1993

[30] Foreign Application Priority Data

Mar. 12, 1992 [GB] United Kingdom ............... 9205459
Jan. 22, 1993 [GB] United Kingdom ............... 9301198

[51] Int. Cl.$^5$ .......................... C01B 35/12; C22B 1/14
[52] U.S. Cl. .................................. 423/279; 23/313 R; 71/61; 71/64.05; 423/280
[58] Field of Search ............... 423/281, 279, 280; 23/313 R; 71/61, 64.05

[56] References Cited

U.S. PATENT DOCUMENTS

| | | | |
|---|---|---|---|
| 1,961,073 | 5/1934 | Newman | 423/280 |
| 2,094,881 | 10/1937 | Gale | 423/280 |
| 4,256,479 | 3/1981 | Harrison | 423/280 |
| 4,681,748 | 7/1987 | Doetsch et al. | 423/281 |
| 4,857,286 | 8/1989 | Mazzinghi | 423/280 |
| 4,968,500 | 11/1990 | Bertsch-Frank et al. | 423/281 |
| 5,094,827 | 3/1992 | Bertsch-Frank et al. | 423/281 |

*Primary Examiner*—Wayne Langel
*Attorney, Agent, or Firm*—James R. Thornton

[57] ABSTRACT

A process for preparing granular water soluble alkali metal borate compositions by agitating a finely divided feedstock comprising a water soluble alkali metal borate and optionally boric acid, the molar ratio of alkali metal oxide to boric oxide in the feedstock being from about 0.1 to 0.5:1, optionally heating the agitated feedstock particles, contacting the agitated feedstock particles with an aqueous granulating agent to agglomerate feedstock particles, and recovering a granular borate composition having an average particle size of at least 250 micro meters. The resultant granulated product has a higher bulk density and better water dissolution rate than the feedstock particles.

18 Claims, No Drawings

PREPARATION OF GRANULAR COMPOSITIONS

This invention relates to a process for the preparation of granular borate compositions and to certain granular reaction products formed during granulation.

Processes for manufacturing particulate materials, such as spray drying, often yield products in the form of small particles. Such products are frequently difficult to handle and typically are dusty and of low bulk density.

Techniques for the granulation of small particles to provide larger particle sized products are well known. A comprehensive review of processes for granulation is given, in Kirk-Othmer's Encyclopedia of Chemical Technology, Third Edition (21) pp 77–105.

Agglomeration techniques are often included in the preparation of powder detergent compositions wherein the individual ingredients have variable particle sizes and are liable to settle rapidly on storage. Agglomeration is accomplished by the addition of water as an agglomerating agent, but the products have a tendency to cake on storage in their cartons, so the use of additives such as anionic surfactants and anti-caking agents has been proposed, see for example U.S. Pat. No. 4029608 and EP-A-0060587.

Granulation of alkali metal borates has been previously described. U.S. Pat. No. 4256479 discloses a process for granulating sodium tetraborate pentahydrate to produce a pre-determined particle size range suitable for fertilizer bulk-blending operations by introducing a stream of small amounts of acid solutions, such as sulfuric acid and/or phosphoric acid, onto agitated feedstock.

Spray dried sodium octaborate (a sodium borate composition of the approximate formula $Na_2B_8O_{13}.4H_2O$—also known as disodium octaborate tetrahydrate), manufactured by spray drying an aqueous solution containing boric acid and borax in the molar ratio of 4:1, is an amorphous product having particle sizes less than 0.075 mm and a typical poured bulk density of 0.32 kg/l. The product is used commercially as a source of boron, an essential element for plant growth, for fertilizers, as a timber preservative and as a flame retardant. In all these applications it is essential that the product should dissolve rapidly in liquid carriers, usually water. Typically, 1 kg of spray-dried sodium octaborate will dissolve in 20 liters of water at 20° C. in 5 to 7 minutes.

Microscopic examination of spray-dried sodium octaborate shows particle shapes displayed as broken microspheres. The material has a low bulk density due to the particle shape and packing characteristics, has poor flow characteristics and dust may be released on emptying large amounts of material into dissolving tanks.

The process of this invention addresses such inherent disadvantages of water soluble borates, such as spray-dried sodium octaborate, and provides a granular product having improved rates of solubility, better flow characteristics and substantially increased bulk density which all lead to easier handling and storage. In addition, granular products in accordance with this invention are suitable for mixing with other materials and compositions, for example in the manufacture of fertilizer blends.

The present invention provides a process for granulating finely powdered borate feed materials by agitation and the addition of a granulating agent. The invention also provides granular borate compositions of high bulk density which are non-dusting, have a faster rate of dissolution in aqueous media than the feed materials and have an improved ability to flow compared with the feed materials.

According to the present invention, there is provided a process for preparing a granular water soluble alkali metal borate composition which comprises:
  a. agitating a finely divided feedstock having an average particle size of less than 75 μm and comprising a water soluble alkali metal borate and optionally boric acid ($H_3BO_3$), the molar ratio of alkali metal oxide to boric oxide ($B_3BO_3$) in the feedstock being from about 0.1 to 0.5:1;
  b. optionally heating the agitated feedstock particles to a temperature of at least 50° C.;
  c. contacting the agitated feedstock particles with an aqueous granulating agent to agglomerate feedstock particles; and
  d. recovering a granular borate composition having an average particle size of at least 250 μm.

In the context of the present invention a finely divided feedstock material is one which has an average particle size of less than about 75 μm but there may be amounts of particles having a particle size up to about 250 μm, whereas the product granules have an average particle size of at least 250 μm and may have an average particle size up to about 1 mm. Preferred products are those in which the proportion of oversized granulates, for example granules having a particle size in excess of 1 mm or 500 μm, is reduced, as is the proportion of undersized granulates and/or unchanged feedstock particles. Accordingly, in a preferred embodiment the granular borate composition is screened to remove oversized product (having a particle size in excess of 1 mm or preferably 500 μm) and/or undersized product (having a particle size of less than 250 μm). Preferably, the oversized product thus obtained is pulverized and screened, particles of desired size particle being added to the product and undersized particles either being recycled as feedstock or being dissolved in water to provide an aqueous alkali metal borate solution for use as granulating agent.

The process of this invention may be carried out in any apparatus suitable for the mixing of dry particulate materials and adapted so that a fluid granulating agent can be sprayed on or otherwise added to the agitated feedstock particles. Conventional granulation equipment can be used. The mixing apparatus may be selected for continuous or batch operation.

The invention provides a process for the granulation of borates or borate compositions and produces granules in a desired particle size range which granules show an unexpected improvement in the rate of dissolution of the product in aqueous media over that of the feedstock materials.

The invention is described in more detail by reference to the granulation of sodium octaborate, prepared by spray drying, and to the granulation of mixtures of borax pentahydrate ($Na_2B_4O_7.5H_2O$) and boric acid in a finely divided intimate mixture approximating the molar ratio of 1:4 although it is understood that the invention can equally well be applied to mixtures of other starting materials in other proportions within a molar ratio of alkali metal oxide (preferably $Na_2O$) to $B_2O_3$ of about 0.1 to 0.5:1.

A spray dried sodium octaborate feedstock is suitably agitated in a mixer and contacted, for example at ambient temperature, with a spray of a fluid granulating agent, preferably liquid water and optionally also steam, in an amount up to about 25% by weight of the feedstock.

When carried out as a batch process agitation is continued until granulation is complete, the granular product is then discharged and allowed to equilibrate before optionally being screened.

When the process is carried out continuously, the residence time within the mixing apparatus need be only long enough to bring about the desired degree of contact between the feedstock particles and the aqueous granulating agent and can therefore be very short, of the order of a few seconds. The granular product is then preferably discharged into a drier, preferably a fluid bed drier, in which water is driven off. When using a fluid bed drier a suitable air inlet temperature is at least 130° C., preferably 150° C., and suitable residence times in the drier are from about 10 to 30 minutes. It is thought that the higher temperature in a drier can contribute towards the strength of the final granular borate composition, i.e. increasing the drier temperature hardens the granules.

By proper adjustment of the process variables such as the rate and amount of granulating agent added, speed of rotation of the mixer, product residence time within the mixer and placement of spray to achieve maximum contact of the granulating agent with the feedstock particles to be granulated, a granular product containing a high proportion of granules of a desired particle size can be discharged from a mixer. Undersized and/or oversized particles can be removed, as by screening, if a narrow particle size distribution is desired for the granulated product.

The preferred granulating agent is water and optionally also steam although other agents comprising aqueous solutions of alkali metal borates, preferably sodium borates, may be used. In a further feature of the invention the granulating agent is a solution of oversized product recycled from a previous preparation of granules. In addition the granulating agent may optionally contain an ionic or nonionic surfactant.

If desired, an acid can be added to the granulating agent and/or the feedstock to reduce the pH of solutions obtained upon dissolution of the granular product. A pH of about 7.8 or below is required for solutions of granular products obtained in accordance with this invention if they are to be compatible with other micronutrient fertilizers, such as manganese sulfate. In theory any soluble acid can be used for this purpose, for example citric acid.

The granulation step is suitably carried out at ambient temperature when granulating sodium octaborate compositions. There is an exothermic reaction during the process whereby the temperature within the mixer may reach about 60° C. With mixtures of borates and boric acid it may be necessary to raise the temperature of the particles to about 60° C. before granulation will take place.

With respect to sodium octaborate, the theoretical basis for the unexpected improvement in the solubility of the granulated particulate material over the original spray dried material is believed to be at least partly attributable to the formation of a reaction product according to the following equation:

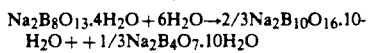

The products according to the process of this invention consist of white, free flowing granules, of which up to about 90% by weight pass through a 500 μm screen and less than about 0.5% by weight pass through a 0.075 mm screen. X-ray diffraction analysis of the product confirms the reaction as described above as it shows the product to consist of crystalline sodium pentaborate and borax. It is therefore a feature of this invention that the granulation process according to this invention, using for example sodium octaborate feedstock, yields a new composition of matter which dissolves more rapidly in aqueous media than does spray-dried sodium octaborate.

Any oversize material in the granular product from the agitator may be pulverized and then screened with suitably sized particles added to the product and undersized particles recycled to the mixer with fresh feedstock. Alternatively it may be dissolved in water and recycled to the mixer as a component of the aqueous granulating agent in an amount of up to about 20% by weight. Undersize material may be recycled directly with fresh feedstock.

The granulating agent is suitably added in an amount of up to about 25% by weight of the feedstock, preferably an amount of 15 to 25%; more preferably 18 to 22%, by weight of the feedstock is used. Greater amounts may lead to the formation of excessively large granules and the build up of deposits on the mixer walls during granulation.

A liquid granulating agent is preferably added to the feedstock as a fine mist through a nozzle which may be operated either ultrasonically or pneumatically at a rate to ensure that all feedstock is contacted and there is sufficient time for intimate mixing, reaction and granulation to take place.

In another embodiment of the invention, dyes such as methylene blue, may be added to the granulating agent to provide products having dyed appearances which may in addition be mixed with the usual white product to give products of speckled appearance.

Alkali metal borates and boric acid in finely divided form are produced during the commercial production of the borates and boric acid. This finely divided material can be an important source of feedstock material in the process of the present invention.

When using a feedstock material comprising a mixture of an alkali metal borate, for example borax pentahydrate, and boric acid, it is preferably heated to about 60° C. prior to the addition of the granulating agent, to ensure the desired granulation and reaction take place.

The theoretical basis of the reaction taking place with a mixture of borax pentahydrate and boric acid in a molar ratio of about 1:4 on addition of the granulating agent is as follows:

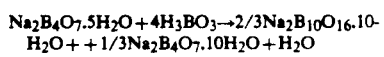

On heating the product of the invention according to this embodiment, free water is driven off and a product is formed having a similar boric oxide content and properties to that formed when sodium octaborate alone is used as a starting material. On the product further, a higher $B_2O_3$ content can be achieved without affecting the dissolution rate.

The invention is further illustrated by reference to the following Examples.

EXAMPLES

For Examples 1-3 and 6 the mixing apparatus used was an Eirich intensive mixer with an agitator operating at 1375 rpm, a rotating drum and fixed scraper blade, having a maximum batch capacity of 10 liters. For Examples 4 and 5, a Winkworth high speed plough mixer was used. This has an approximate working capacity of 100 liters and operated at a maximum plough shaft speed of 186 rpm. A Schugi in-line continuous vertical granulator was used for Examples 7-9.

A feedstock of sodium octaborate particles (typically 92% by weight of which pass through a 0.075 mm screen (USS 200 mesh)) available from U.S. Borax Inc. under the registered trademark SOLUBOR, was used for Examples 1-5 and for comparative solubility tests.

EXAMPLE 1

SOLUBOR particles (2.5 kg) were charged to an Eirich mixer and agitated. Water (525 g) was sprayed onto the agitated particles as a fine mist through an ultrasonic atomizer over a period of 2.5 minutes. Agitation was continued for a further 1 minute and the resulting granular material was discharged onto open trays and allowed to equilibrate for a further 25 minutes.

EXAMPLE 2

SOLUBOR particles (2.5 kg) were charged to an Eirich mixer and agitated. Water (500 g) was sprayed onto the agitated particles at an atomizing pressure of 0.14 MPa (20 psi) over a period of 2.5 minutes. Agitation was continued for a further 30 seconds and the granular product was discharged onto open trays for equilibration.

EXAMPLE 3

SOLUBOR particles (1.5 kg) were charged to an Eirich mixer and agitated. A 15% by weight sodium pentaborate solution (500 g was sprayed ultrasonically onto the agitated particles over a period of 4 minutes. The granular product was discharged onto open trays for equilibration.

EXAMPLE 4

SOLUBOR particles (25 kg) were charged to a Winkworth mixer and agitated. Water (5 l) was finely sprayed onto the agitated charge over a period of 6 mins. 20 secs. Agitation was continued for a further 7 minutes and a granular product was discharged.

During granulation the temperature within the mixer rose to 54° C.

EXAMPLE 5

SOLUBOR particles (25 kg) were charged to a Winkworth mixer and agitated. Water (5.5 l) was finely sprayed onto the agitated charge over a period of 7 mins. 15 secs. Agitation was continued for a further 45 seconds and the granular material was discharged.

During granulation the temperature within the mixer rose to 50° C.

EXAMPLE 6

1 kg (16.2 moles) of fine particulate boric acid (−250 μm) was intimately mixed with 1.2 kg (4.1 moles) of fine particulate borax pentahydrate (−250 μm) (corresponding to 3.93 moles of boric acid per mole of borax pentahydrate) in an Eirich mixer. The mixer bowl was heated electrically to preheat the mixed particles to a temperature of approximately 50° C. The mixture was agitated at 1375 rpm and water (100 g) was sprayed through an ultrasonic atomizer onto the agitated mixture over a period of one minute.

The granular product was dried in a fluid bed drier at an inlet air temperature of 100° C. for 10 minutes. The particle size of the product was greater than 500 μm.

DISSOLUTION RATES

Comparative tests for dissolution rates were carried out according to the following procedure.

The test sample (10 g) was poured into water (190 g) at 20° C. contained in a 250 ml breaker. The mixture was stirred magnetically at 500 rpm and the time to obtain a clear solution was determined. The results were as follows:

| Example | Time (Secs.) |
| --- | --- |
| 1 | 90 |
| 2 | 80 |
| 3 | 70 |
| 4 | 60 |
| 5 | 80 |
| 6 | 90 |
| SOLUBOR (Comparative) | 240 |

The poured bulk density of each product prepared according to the invention was of the order of 0.6 kg/l as compared with SOLUBOR which has a poured bulk density of 0.32 kg/l.

EXAMPLE 7

Finely divided boric acid (200 kg); 3234 moles was mixed with finely divided borax pentahydrate (236 kg); 810 moles and conveyed to a storage silo. The mixture, corresponding to 3.99 moles of boric acid per mole of borax pentahydrate, was fed onto a conveyor at a rate of 560 kg/hr to a granulator wherein steam, under a pressure of 2.8 bar, and hot water were fed continuously at rates of 22 l/hr and 12 l/hr, respectively. The mixture was resident in the granulator for approximately 2 seconds and was then passed to a fluid bed drier with an air inlet temperature of 150° C. The residence time of the material in the fluid bed drier was between 15 and 30 minutes.

The granular product from the fluid bed drier was conveyed to a 1 mm screen. Oversize material was crushed and added to the product.

The mean particle size of the product was 500 μm and on analysis was found to contain 56% by weight $B_2O_3$.

EXAMPLE 8

Finely divided boric acid (260 kg); 4206 moles was mixed with finely divided borax pentahydrate (196 kg); 673 moles and conveyed to a storage silo. The mixture, corresponding to 6.25 moles of boric acid per mole of borax pentahydrate, was fed onto a conveyor at a rate of 580 kg/hr to a granulator wherein steam, under a pressure of 4.2 bar, and hot water were fed continuously at rates of 32.5 l/h and 10 l/hr, respectively. The mixture was resident in the granulator for approximately 2 seconds and was then passed to a fluid bed drier with an air inlet temperature of 150° C. The residence time of the material in the fluid bed drier was between 15 and 30 minutes.

The granular product from the fluid bed drier was conveyed to a 1 mm screen. Oversize material was crushed and added to the product.

The mean particle size of the product was 500 μm and on analysis was to contain 56% by weight $B_2O_3$.

EXAMPLE 9

SOLUBOR particles (1.5 kg), boric acid particles (0.45 kg) and citric acid monohydrate (0.15 kg were charged to an Eirich mixer and agitated. Water (0.3 kg) was sprayed ultrasonically at a rate of 35 l/hr onto the agitated particles. After a period of 6 minutes the granular material was discharged onto open trays for equilibration.

SOLUBILITY TESTS

Comparative solubility tests were carried out as described above for Examples 1 to 6.

| Example | Time (Secs.) |
| --- | --- |
| 7 | 90 |
| 8 | 90 |
| 9* | 90 |
| SOLUBOR** | 240 |

*pH of 5.5% solution 7.1. Manganese sulfate (3 g.) was added. After a further 90 seconds the solution was clear. A further 3 g of manganese sulfate were added and these also dissolved.
**Comparative

We claim:

1. A process for preparing a granular water soluble alkali metal borate composition containing a major amount of alkali metal pentaborate which comprises:
   (a) agitating a finely divided feedstock having an average particle size of less than 75 μm and comprising a water soluble alkali metal borate and optionally boric acid, the molar ratio of alkali metal oxide to boric oxide in the feedstock being from about 0.1 to 0.5:1;
   (b) optionally heating the agitated feedstock particles to a temperature of at least 50° C.;
   (c) contacting the agitated feedstock particles with an aqueous granulating agent to agglomerate feedstock particles; and
   (d) recovering a granular borate composition having an average particle size of at least 250 μm.

2. A process according to claim 1, wherein the amount of aqueous granulating agent is from 18 to 22% by weight, based on the weight of the feedstock.

3. A process according to claim 1, wherein the alkali metal is sodium.

4. A process according to claim 3, wherein the feedstock comprises a spray dried sodium octaborate of the formula $Na_2B_8O_{13}.4H_2O$.

5. A process according to claim 4, wherein the feedstock consists essentially of spray dried sodium octaborate and the resulting granular borate composition is of the formula $$2/3Na_2B_{10}O_{16}.10H_2O:1/3Na_2B_4O_7.10H_2O.$$

6. A process according to claim 3, wherein the feedstock comprises a mixture of borax pentahydrate and boric acid.

7. A process according to claim 6 wherein the mixture comprises about 4 moles of boric acid per mole of borax pentahydrate and yields a granular borate composition of the formula $$2/3Na_2B_{10}O_{16}.10H_2O:1/3Na_2B_4O_7.10H_2O.$$

8. A process according to claim 1, wherein the granular borate composition is screened to remove oversize product having a particle size in excess of 1 mm and/or undersized product having a particle size of less than 250 μm.

9. A process according to claim 8, wherein oversized product is pulverized and screened, particles of desired size particle are added to the product and undersized particles either are recycled as feedstock or dissolved in water to provide an aqueous alkali metal borate solution for use as granulating agent.

10. A process according to claim 3, wherein the agglomerated particles are fed to a fluid bed drier having an air inlet temperature of at least 130° C.

11. A process according to claim 10, wherein said air inlet temperature is about 150° C. and the residence time in the drier is about 10 to 30 minutes.

12. A process according to claim 1, wherein a liquid granulating agent is applied as a fine mist through a nozzle operated ultrasonically or pneumatically.

13. A process according to claim 1, wherein the granulating agent comprises liquid water and steam.

14. A process according to claim 6, wherein said mixture is heated at about 60° C.

15. A process according to claim 14, wherein said granulating agent comprises hot water and steam.

16. A process according to claim 6, wherein the feedstock mixture comprises about 6 moles of boric acid per mole of borax pentahydrate.

17. A process for preparing a granular, water soluble sodium pentaborate composition which comprises:
   (a) agitating a finely divided feedstock having an average particles size of less than 75 μm and comprising a mixture of sodium borate and boric acid, the molar ratio of sodium oxide to boric oxide in said feedstock being from about 0.1 to 0.5:1;
   (b) contacting the agitated feedstock particles with an aqueous granulating agent comprising water and steam to agglomerate said feedstock particles;
   (c) feeding said agglomerated particles to a fluid bed drier having an air inlet temperature of at least 130° C.; and
   (d) recovering a granular sodium pentaborate composition having an average particles size of at least 250 μm.

18. A water soluble borate composition having the approximate formula $2/3Na_2B_{10}O_{16}.10H_2O:1/3Na_2B_4O_7.10H_2O$ in the form of free flowing granules up to 90% by weight of which pass through a 500 μm screen and fewer than about 0.5% by weight pass through a 75 μm screen.

* * * * *